(12) United States Patent
Rana et al.

(10) Patent No.: US 10,288,879 B1
(45) Date of Patent: May 14, 2019

(54) METHOD AND SYSTEM FOR GLINT/REFLECTION IDENTIFICATION

(71) Applicant: Tobii AB, Danderyd (SE)

(72) Inventors: Pravin Kumar Rana, Danderyd (SE); Yimu Wang, Danderyd (SE)

(73) Assignee: Tobii AB (SE)

( * ) Notice: Subject to any disclaimer, the term of this patent is extended or adjusted under 35 U.S.C. 154(b) by 0 days.

(21) Appl. No.: 15/994,550

(22) Filed: May 31, 2018

(51) Int. Cl.
*G06F 3/01* (2006.01)
*G06K 9/00* (2006.01)
*G02B 27/01* (2006.01)

(52) U.S. Cl.
CPC ......... *G02B 27/0101* (2013.01); *G06F 3/013* (2013.01); *G06K 9/0061* (2013.01); *G02B 27/0172* (2013.01); *G02B 2027/014* (2013.01)

(58) Field of Classification Search
None
See application file for complete search history.

(56) References Cited

U.S. PATENT DOCUMENTS

| | | | |
|---|---|---|---|
| 7,572,008 | B2 | 8/2009 | Elvesjo et al. |
| 9,041,787 | B2 | 5/2015 | Andersson et al. |
| 2007/0040908 | A1 | 2/2007 | Cleveland et al. |
| 2009/0189830 | A1* | 7/2009 | Deering .................. G09G 3/02 345/1.3 |
| 2016/0042221 | A1 | 2/2016 | Mei et al. |
| 2016/0103484 | A1 | 4/2016 | Guo et al. |
| 2017/0329398 | A1 | 11/2017 | Raffle et al. |
| 2018/0157909 | A1* | 6/2018 | Ollila ................. G06K 9/00604 |

OTHER PUBLICATIONS

Gwon et al., "Gaze Tracking System for User Wearing Glasses", Sensors, vol. 14, No. 2, Jan. 27, 2014, pp. 2110-2134.

* cited by examiner

*Primary Examiner* — Dakshesh D Parikh
(74) *Attorney, Agent, or Firm* — Condo Roccia Koptiw LLP

(57) ABSTRACT

An image of an eye of a user can be received from an image sensor, the image resulting from the image sensor detecting light from one or more illuminators reflected from the eye of the user and reflected from optic arrangements located between the one or more illuminators and the eye of the user, wherein the optic arrangements comprise features having a known pattern. Glints are identified in the image, wherein a glint is a representation in the image of a reflection of light from a cornea of the eye of the user and/or from a feature of the optic arrangements. Relative positions in the image of the identified glints are determined, and on condition that the relative positions conform with the known pattern, at least one glint of the identified glints is identified as a representation in the image of a reflection from a feature of the optic arrangements.

12 Claims, 5 Drawing Sheets

METHOD AND SYSTEM FOR GLINT/REFLECTION IDENTIFICATION

TECHNICAL FIELD

The present disclosure generally relates to the field of eye tracking. In particular, the present disclosure relates to systems and methods for use in identifying reflections from optical arrangements in an eye tracking system.

BACKGROUND

In eye tracking applications, digital images are retrieved of the eyes of a user and the digital images are analyzed in order to estimate the gaze direction of the user. There are different methods for achieving such an estimation. In some methods ambient light is used when retrieving images of the eyes of the user and in some methods additional light sources (illuminators) are used to illuminate the eyes for retrieving images of the eyes of the user. Generally, the estimation of the gaze is based on identification of the pupils of the eyes of the user, together with identification of glints (corneal reflections) in the eyes of the user.

One known method of eye tracking includes the use of infrared light and an image sensor. The infrared light is directed towards the pupil of a user and the reflection of the light is captured by an image sensor. Through analysis of the reflection point, the direction of the user's gaze may be calculated. One such system is described in U.S. Pat. No. 7,572,008 (which is hereby incorporated by reference in its entirety).

Portable or wearable eye tracking devices have also been previously described. One such eye tracking system is described in U.S. Pat. No. 9,041,787 (which is hereby incorporated by reference in its entirety). A wearable eye tracking device is described using illuminators and image sensors for determining gaze direction.

In applications of eye tracking for in portable or wearable eye tracking devices, such as in virtual reality (VR) devices, where head mounted devices are used which include an eye tracking system determining an eye direction and/or gaze direction based on a pupil center and glints from illuminators illuminating a user's eyes, problems can arise for example for a user who is wearing a pair of spectacles under the VR glasses. For example, one or more reflections from an optic arrangement of the pair of spectacles caused by the one or more of the illuminators may result in a situation where the pupil cannot be accurately identified or where no or too few glints can be identified for eye tracking. In such situations it will be difficult or impossible to determine eye direction and/or gaze direction and or eye direction or at least not with desirable reliability.

It would be desirable to provide an eye tracking technology to account for such situations where reflections from glasses worn under VR glasses reduce the accuracy of eye tracking or makes it difficult or impossible to determine eye direction and/or gaze direction for eye tracking.

SUMMARY

An object of the present disclosure is to address the issues with known systems and methods.

According to a first aspect, there is provided a method of identifying reflections from optical arrangements in an eye tracking system. The method comprises receiving an image of an eye of a user from an image sensor. The image is a result of the image sensor detecting light from one or more illuminators reflected from the eye of the user and reflected from optic arrangements located between the one or more illuminators and the eye of the user. The optic arrangements comprise features characterized by (e.g., having) a known pattern. Two or more glints are identified in the image, wherein a glint is a representation in the image of a reflection of light from a cornea of the eye of the user and/or from at least one feature of the optic arrangements. Relative positions in the image of the identified glints are then determined. On condition that the relative positions in the image of the identified glints conform with the known pattern of the features of the optic arrangements, at least one glint of the identified glints is identified as being a representation in the image of a reflection from a feature of the optic arrangements.

As indicated in the background, some factors that may potentially cause difficulty of determination of gaze direction remain in known method and systems based on identification of the pupils of the eyes of the user together with identification of glints. In eye tracking systems different optical arrangements are used, e.g. to direct illuminated light towards an eye of a user and towards an image sensor to produce an image for use in eye tracking. Furthermore, other optical arrangements may be present which are not directly connected to the eye tracking system, such as a lens/glass of a pair of spectacles used by the user of the eye tracking system. In some situations, the optical arrangements of the eye tracking system and other will together result in reflections that will be represented as glints in images captured for use in the eye tracking systems. These glints are generally not useful for eye tracking and rather risk to be mistaken for corneal reflections used in eye tracking and hence risk to introduce errors. For example, in a situation where representations of reflections from features of optic arrangements located between the plurality of illuminators and the eye of the user appear in the image in addition the representation of the reflections from the eye of the user, such reflections risk to introduce errors in an eye tracking algorithm such that it will be difficult or impossible to determine eye direction and/or gaze direction or at least not with desirable accuracy. Identifying a glint that is a representation of a reflection from at least one feature of the optical arrangements reduces the risk of introduction of errors in the eye tracking system by mistakenly identifying such glints as representations of corneal reflections.

The system may be a wearable system (head mounted system), such as a virtual reality (VR) system where goggles (glasses) are used arranged on the head of the user, such that illuminators arranged in the head mounted system will move together with the head of the user and hence the illuminators will be fixed in relation to the eyes of the user when the system is used by the user. The illuminators are fixed in relation to the eyes of the user provided that the VR device does not move in relation to the head during use.

The image sensor can be any suitable type of imaging sensor.

The eye may for example be illuminated by a plurality of illuminators which may for example be light sources such as light emitting diodes and the light emitted may be visible light or infrared light.

That the relative positions in the image of the identified glints conform with the known pattern of the features of the optic arrangements may for example mean that the identified glints are arranged in relation to each other in the image in terms of distances, angles, pattern etc. which would be expected for glints resulting from reflections given the know pattern of the features of the optic arrangement.

In some embodiments, the optic arrangements comprise a Fresnel lens, and the features having a known pattern are a plurality of concentric Fresnel rings of the Fresnel lens having known distances between consecutive Fresnel rings. The known distances may be uniform, i.e. the distance between two consecutive rings may be the same between all two consecutive rings. The known distances may also differ as a function of the distance from the center of the Fresnel lens, e.g. such that the distance between two consecutive rings becomes larger or becomes smaller the further away from the center of the lens the rings are located, e.g. such that the distance is uniform with a first distance from the center to a given distance from the center of the lens and then uniform with a second (larger or smaller) distance from the given distance and further away from the center of the lens. All functions are feasible as long as the function is known.

In some embodiments, determining relative positions of the identified glints comprises determining a distance in the image between a first glint and a second glint of the identified glints. The relative positions in the image of the identified glints conform with the known pattern of the features of the optic arrangements on condition that the distance in the image between the first glint and the second glint of the identified glints conforms with the known distances between consecutive Fresnel rings of the plurality of concentric Fresnel rings of the Fresnel lens.

Reflections from Fresnel rings will generally be from corresponding portions of different Fresnel rings. Hence, given a known distance between two consecutive Fresnel rings, the distance between reflections from two consecutive rings will be substantially the same as the distance between the consecutive rings. This will result in glints in the image with a distance in the image corresponding to the distance between the rings. The corresponding distance can be calculated given the current setup of the eye tracking system comprising the image sensor capturing the image and the Fresnel lens.

In some embodiments where the optic arrangements comprise a Fresnel lens, a pupil position of a representation in the image of a pupil of the eye is determined, and distances in the image from the pupil position to the identified glints are determined. The at least one glint is identified as a representation of a reflection from a Fresnel ring of the Fresnel lens on the further condition that the distance in the image from the pupil position to the at least one glint is larger than a predetermined threshold value.

Glints resulting from corneal reflections most useful for eye tracking are those resulting from corneal reflections within a distance from the pupil position where the cornea can be approximated as a spherical surface. In order to avoid mistakenly identifying such glints in the image resulting from corneal reflections must useful for eye tracking as glints resulting from reflections from features of the optical arrangements (Fresnel rings), identification of glints resulting from reflections from the features of the optical arrangements is only made for glints with a distance from the pupil which is larger than the predetermined threshold value. The predetermined threshold value may e.g. be set to (or based on) the distance in the image corresponding to the distance from the pupil position where the cornea can be approximated as a spherical surface.

In some embodiments where the optic arrangements comprise a Fresnel lens and where at least three glints are identified, determining relative positions in the image of the identified glints comprises determining a distance in the image between the first glint and the second glint, and determining a distance in the image between the second glint and the third glint. The relative positions in the image of the identified glints conform with the known pattern of the features of the optic arrangements on condition that the determined distance in the image between the first glint and the second glint and the determined distance between the second glint and the third glint conform with the known distances between consecutive Fresnel rings of the plurality of concentric Fresnel rings of the Fresnel lens, and the first glint, the second glint and the third glint are positioned on a straight line in the image.

Reflections from Fresnel rings will generally be from corresponding portions of different Fresnel rings. Hence, given a known distance between two consecutive Fresnel rings, the distance between reflections from two consecutive rings will be substantially the same as the distance between the consecutive rings. This will result in glints in the image with a distance in the image corresponding to the distance between the rings. The corresponding distance can be calculated given the current setup of the eye tracking system comprising the image sensor capturing the image and the Fresnel lens. Furthermore, as reflections from Fresnel rings will generally be from corresponding portions of different Fresnel rings, the reflections will generally appear on a straight line starting from the center of the Fresnel lens. Hence, glints in the image resulting from reflections from the Fresnel rings will generally appear in a straight line in the image starting from a position in the image corresponding to the center of the Fresnel lens in the current setup of the eye tracking system comprising the image sensor capturing the image and the Fresnel lens.

In some embodiments where the optic arrangements comprise a Fresnel lens and where the known distances between consecutive Fresnel rings of the plurality of concentric Fresnel rings of the Fresnel lens is a function of a distance from a center of the Fresnel lens, positions of the identified glints in the image are determined, and distances from the center of the Fresnel lens corresponding to the positions of the identified glints in the image are determined.

In a given setup of the eye tracking system comprising the image sensor capturing the image and the Fresnel lens, a position in the image corresponding to the center of the Fresnel lens can be determined and a distance in the image corresponding to a distance on the Fresnel lens can be determined. Hence, an expected distance in the image between glints resulting from reflections from Fresnel rings can be determined based on the function.

In some embodiments, a region of interest (ROI) is defined including the representation of the pupil in the image. Furthermore, only glints in the ROI are identified.

The region of interest is defined such that glints resulting from reflections from an eye of a user outside the region of interest are not suitable for use in an eye tracking algorithm, whereas glints resulting from reflections from an eye of a user inside the region of interest may be suitable for use in an eye tracking algorithm. The region of interest may have any suitable shape, such as rectangle, square, circle, ellipse, etc.

Any glints in the image outside the region of interest are optionally not identified or at least not processed further. This is true both for glints resulting from a reflection of light from a cornea of the eye of the user and for glints resulting from a reflection of light from a feature of the optic arrangements. By limiting the glints identified and/or processed further to any glints in the region of interest, a reduction of the amount of processing required is enabled. At the same time, not processing glints outside the region of interest will not, or at least only to a low degree, affect the possibility to identify the representation of the pupil and/or the glints in the image depending on the definition of the region of interest.

In some embodiments, the one or more illuminators are arranged at substantially fixed positions in relation to an eye of a user when using the system.

In some embodiments, the optic arrangements located between the plurality of illuminators and the eye of the user when the user is using the eye tracking system may comprise an optic arrangement that converges or diverges light, such as a lens/glass of a pair of spectacles worn by the user in addition to and separate to the eye tracking system.

According to a second aspect, there is provided an eye tracking system comprising a receiver for receiving an image of an eye of a user from an image sensor, the image resulting from the image sensor detecting light from one or more illuminators reflected from the eye of the user and reflected from optic arrangements located between the one or more illuminators and the eye of the user, wherein the optic arrangements comprise features characterized by (e.g., having) a known pattern. The eye tracking system further comprises processing circuitry for identifying two or more glints in the image, wherein a glint is a representation in the image of a reflection of light from a cornea of the eye of the user or from a feature of the optic arrangements, determining relative positions in the image of the identified glints, and on condition that the relative positions in the image of the identified glints conform with the known pattern of the features of the optic arrangement, identifying at least one glint of the identified glints as being a representation of a reflection from a feature of the optic arrangements.

The optic arrangements located between the plurality of illuminators and the eye of the user when the user is using the eye tracking system may be any optic arrangements that converge or diverge light, such as a lens/glass of a pair of spectacles worn by the user in addition to and separate to the eye tracking system.

In embodiments of the eye tracking system the optic arrangements comprise a Fresnel lens, and the features having a known pattern are a plurality of concentric Fresnel rings of the Fresnel lens having known distances between consecutive Fresnel rings.

According to a third aspect, an eye tracking system comprising circuitry configured to perform any one of the method of the first aspect and the embodiments of the first aspect.

Embodiments of the eye tracking system according to the third aspect may for example include features corresponding to the features of any of the embodiments of the method according to the first aspect.

According to a fourth aspect, there is provided one or more computer-readable storage media storing computer-executable instructions that, when executed by an eye tracking system, cause the eye tracking system to perform a method according to the first aspect.

Embodiments of the one or more computer-readable storage media according to the fourth aspect may for example include features corresponding to the features of any of the embodiments of the method according to the first aspect.

The one or more computer-readable media may for example be one or more non-transitory computer-readable media.

It is noted that embodiments of the invention relate to all possible combinations of features recited in the claims.

BRIEF DESCRIPTION OF THE DRAWINGS

Exemplifying embodiments will be described below with reference to the accompanying drawings.

All the figures are schematic and generally only show parts which are necessary in order to elucidate the respective embodiments, whereas other parts may be omitted or merely suggested.

DETAILED DESCRIPTION

Figure 1:
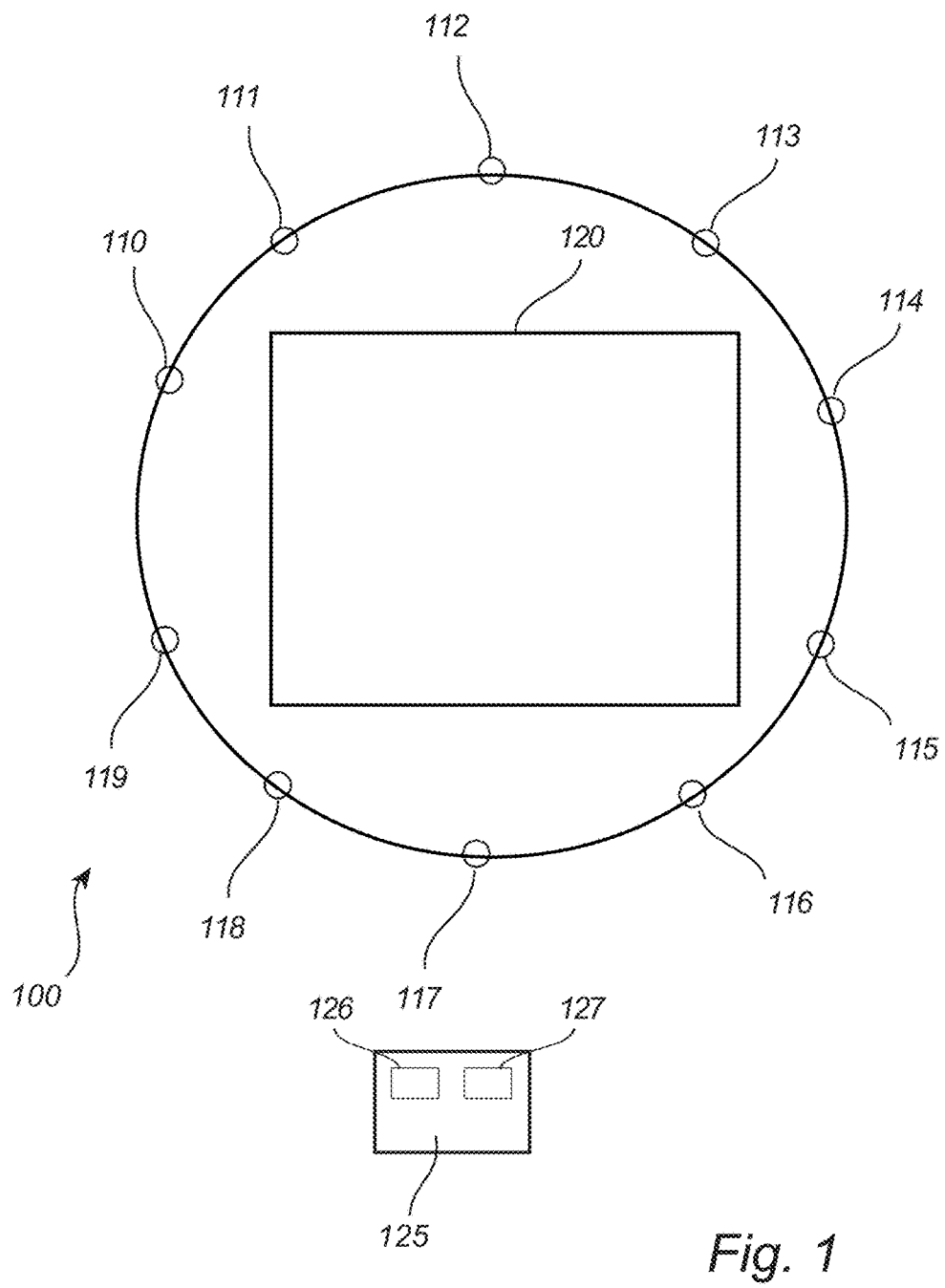
FIG. 1 shows a schematic view of an eye tacking system, in which embodiments may be implemented.

FIG. 1 shows a simplified view of an eye tacking system 100 (which may also be referred to as a gaze tracking system) in a head mounted device in the form of a virtual reality (VR) device or VR glasses. The system 100 comprises illuminators 110-119 for illuminating the eyes of a user, and a light sensor 120 for capturing images of the eyes of the user. The illuminators 110-119 may for example be light emitting diodes emitting light in the infrared frequency band, or in the near infrared frequency band. The light sensor 120 may for example be an image sensor of any type, such as a complementary metal oxide semiconductor (CMOS) image sensor or a charged coupled device (CCD) image sensor. The image sensor may consist of an integrated circuit containing an array of pixel sensors, each pixel containing a photodetector and an active amplifier. The image sensor is capable of converting light into digital signals. In reality, as an example, it could be Infrared image sensor or IR image sensor
RGB sensor
RGBW sensor
RGB or RGBW sensor with IR filter The eye tracking system 100 also comprises circuitry 125, for example including a receiver 126 and processing circuitry 127, for receiving and processing the images captured by the light sensor 120. The circuitry 125 may for example be connected to the light sensor 120 and the illuminators 110-119 via a wired or a wireless connection and be co-located with the light sensor 120 and the illuminators 110-119 or located at a distance, e.g. in a different device. In another example, the circuitry 125 may be provided in one or more stacked layers below the light sensitive surface of the light sensor 120.

It is to be noted that the location of the image sensor 120 in FIG. 1 is only for illustrative purposes. The location of the sensor for one eye in a VR device is generally away from the line of sight for the user in order not to obscure a VR display arranged in the VR device for that eye. This is e.g. enabled by means of so called hot mirrors which reflects a portion of the light and the rest of the light to pass, e.g. infrared light is reflected and visible light is allowed to pass.

In the eye tracking system described with reference to FIG. 1, the illuminators 110-119 are arranged in an eye tracking module along the periphery of a circle. This arrangement serves only as an example. It will be appreciated that more or less any number of illuminators and light sensors may be employed for eye tracking, and that such illuminators and light sensors may be distributed in different ways.

Figure 2:
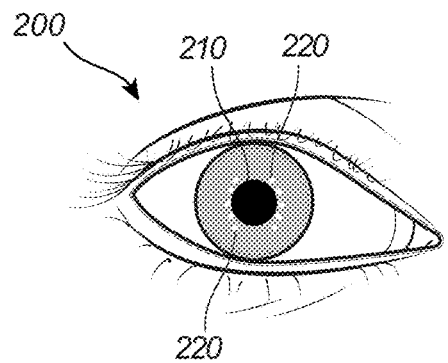
FIG. 2 shows an example image of an eye.

FIG. 2 shows a simplified example of an image of an eye 200, captured by the light sensor 120 of FIG. 1. The circuitry 125 may for example employ image processing (such as digital image processing) for extracting features in the image. The circuitry 125 may for example employ pupil center cornea reflection (PCCR) eye tracking to determine where the eye 200 is looking. In PCCR eye tracking, the position of the center of the pupil 210 and the position of the center of glints 220 at the eye 200 are estimated in the circuitry 125. The glints 220 are caused by reflection of light from the plurality of illuminators 110-119. The circuitry 125 calculates where the user's eye is in space using the glints 220 and where the user's eye 200 is pointing using the pupil 210. Since there is typically an offset between the optical center of the eye 200 and the fovea, the circuitry 125 performs calibration of the fovea offset to be able to determine where the user is looking. The gaze directions obtained from the left eye and from the right eye may then be combined to form a combined estimated gaze direction (or viewing direction).

Figure 3A:
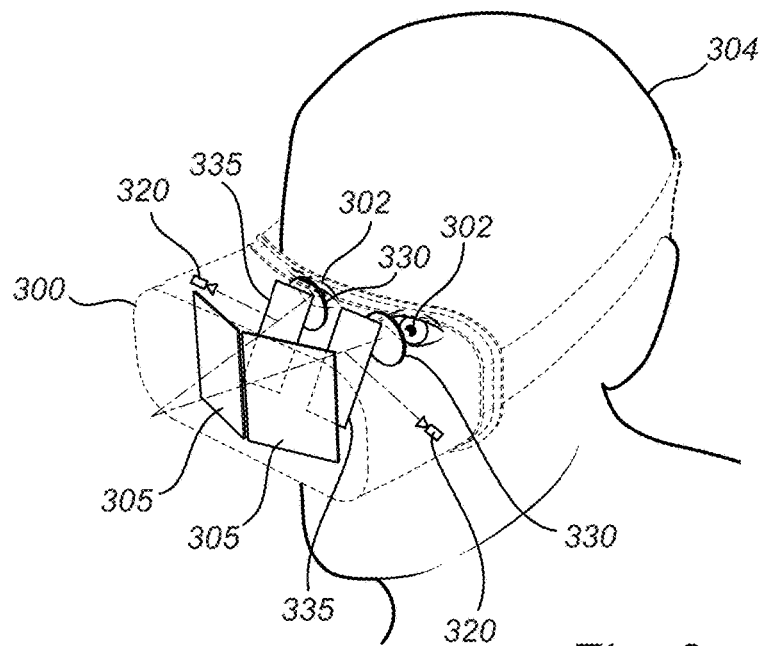
FIG. 3a shows a view of selected parts of a head mounted device.
Figure 3B:
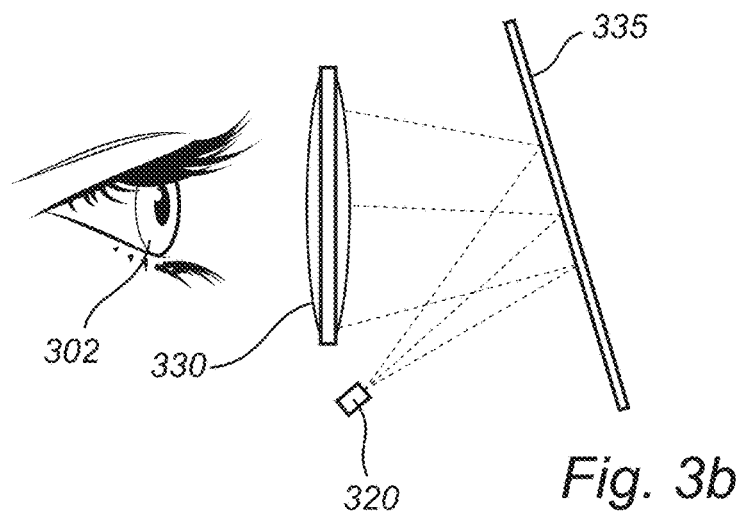
FIG. 3b shows a side view of selected parts of a head mounted device.
Figure 3C:
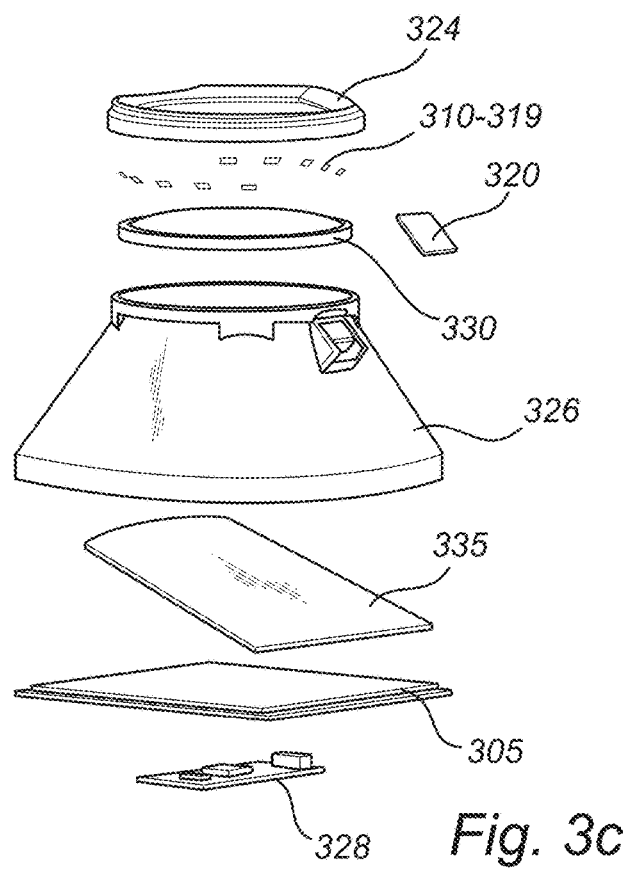
FIG. 3c shows a simplified n exploded view of selected parts of a head mounted device.

FIGS. 3a-c each show a separate view of selected parts of a head mounted device in the form of a virtual reality (VR) device (VR glasses) 300 including an eye tracking system in which embodiments may be implemented.

FIG. 3a shows a view of selected parts of a head mounted device in the form of the VR glasses 300 including an eye tracking system in which embodiments may be implemented. In addition to the VR glasses 300, eyes 302 and a head 304 of a user are shown. The VR portion of the VR glasses 300 shown comprises two VR displays 305 and two VR lenses 330, one VR display 305 and one VR lens 330 for each eye 302. The VR displays 305 are positioned in front of the eyes 302 and the VR lenses 330 are positioned between the eyes 302 and the VR displays 305. In alternative to two VR displays 305, two regions of a single VR display may be used. The eye tracking portion of the VR glasses 300 comprises two hot mirrors 335 and two cameras 320. In order to capture images of the eyes 302 for use in eye tracking, the hot mirrors 335 are arranged between the VR displays 305 and the VR lenses 330. Generally, e.g. in order to reduce weight and size of the VR glasses 300, the VR lenses 330 are so called Fresnel lenses. Furthermore, illuminators (not shown) are arranged on or in the VR glasses 300 such that illumination rays are directed towards the eyes 302. Reflections from the eyes 302 of the illumination rays towards the hot mirrors 335 will reflect towards the cameras 320 in which the illumination rays are detected to produce an image of the eye. For example, the hot mirrors 335 may be of a type such that they will reflect light in the infrared frequency band but be transparent for light in the visible frequency band. The illuminators (not show) used would then produce illumination rays in the infrared frequency band and the cameras 320 will include image sensors able to detect light in the infrared frequency band.

FIG. 3b shows a side view of selected parts of the VR glasses 300. Illumination rays from the illuminators (not shown) towards the eye 302 will reflect back and pass through the VR lens 330 towards the hot mirror 335 and reflect towards the camera 320 in which the illumination rays are detected to produce an image of the eye.

FIG. 3c shows an exploded view of selected parts of the VR glasses 300. Selected parts for one eye are shown including an illuminator cover 324, illuminators in the form of light emitting diodes (LEDs) 310-319, the camera 320 including an image sensor, the VR lens 330, a lens cup or lens tube 326, the hot mirror 335, the VR display 305 and an electronics board 328. FIG. 3c shows an example arrangement of the illuminators in the form of LEDs 310-319, where the LEDs 310-319 are arranged along the periphery of the VR lens 330 to produce a pattern when illuminating the eye 302. The illumination rays from the LEDs 310-319 reflected from the eye and the hot mirror 335 is detected in the camera 320 to produce an image of the eye.

Head mounted devices, such as in VR glasses 300, can be enhanced by including wearable eye tracking using illuminators and one or more light sensors 320 arranged in the head mounted device for determining eye direction and/or gaze direction based on estimation of a position of a center of the pupil and a position of the center of one or more glints at the eye from the illuminators. A problem that can arise in such devices when a further optical arrangement that converges or diverges light, such as spectacles (glasses) worn by the user under the VR glasses 300, light from the illuminators can be reflected by a lens/glass of the spectacles together with features of the VR lens 330, such as the Fresnel rings in the case where the VR lens 330 is a Fresnel lens, onto the image sensor 320. Glints in an image of the eye used for eye tracking corresponding to such reflections may make it difficult or impossible to determine eye direction and/or gaze direction or at least not with desirable accuracy.

Arranging illuminators fixed in the VR glasses in FIGS. 3a-c, will result in the illuminators being arranged at substantially fixed positions in relation to an eye of a user when using the system as long as the VR glasses are not moved in relation to the eye of the user during use.

However, as features of the optical arrangements, such as Fresnel rings of a Fresnel lens, generally have a known pattern, reflections from such features will generally result in glints in an image which conform with the known pattern. Hence, by studying identified glints in the image and whether they conform to the known pattern, glints resulting from reflections from features of the optical arrangements, such as Fresnel rings of a Fresnel lens, can be identified. Subsequent to identification, such glints can be masked form further use in a used eye tracking algorithm.

Figure 4:
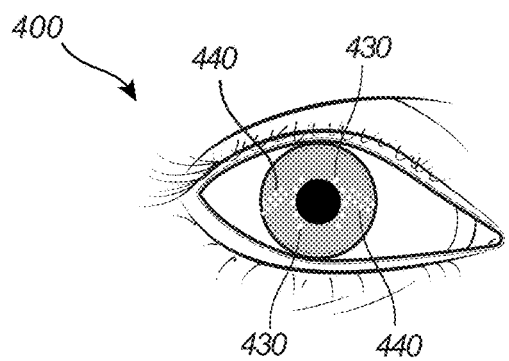
FIG. 4 shows a simplified view of an image of an eye.

FIG. 4 shows a simplified view of an image 400 of an eye of a user in relation to embodiments of which examples are disclosed in the following. The image is captured in a head mounted system such as the VR glasses disclosed in relation to FIGS. 3a-c including a VR lenses which are Fresnel lenses.

The image 400 relates to a situation when the user in addition to the VR glasses also wears a pair of spectacles. The image 400 is schematic. For a more detailed image, reference is made to FIG. 5.

For eye tracking, the eye of the user is illuminated by means of a plurality of illuminators. The image 400 is the result of an image sensor detecting light from the plurality of illuminators reflected from the eye of the user and reflected from a lens of the spectacles together with Fresnel rings of a Fresnel lens of the VR glasses. The lens of the spectacles is located between the plurality of illuminators and the eye of the user and also between the Fresnel lens and the eye of the user. The image 400 of the eye of the user is then received in a processing circuitry from the image sensor.

As is illustrated in FIG. 4, glints 430 resulting from light from the plurality of illuminators reflected from the cornea of the user's eye appear in the image 400. Furthermore, also glints 440 resulting from light from the plurality of illuminators being reflected from the lens of the spectacles together with the Fresnel rings of the Fresnel lens of the VR glasses appear in the image 400. The Fresnel lens in relation to FIG. 4 has a known pattern which in the specific case is that the Fresnel rings are concentric and that the distance between two consecutive Fresnel rings is known for all two consecutive Fresnel rings. For example, the distance between two consecutive Fresnel rings can be uniform, i.e. the same between two consecutive Fresnel rings regardless which distance the two consecutive Fresnel rings are from the center of the Fresnel lens. In alternative, the distance can vary according to a function of the distance from the center of the Fresnel lens. The location of the glints 440 conform with the known pattern of the Fresnel lens of the VR glasses. For uniform distance, the glints 440 appear in straight lines with the same distance between all two consecutive glints where the straight lines are from a point in the image corresponding to a center of the Fresnel lens. The expected distance between two consecutive glints 440 in the image will be possible to determine given the known distance between two consecutive Fresnel rings of the Fresnel lens in the given setup. For varying distance, the glints 440 appear in straight lines with a distance between consecutive glints 440 varying according to the function where the straight lines are from the point in the image corresponding to the center of the Fresnel lens. The expected distance between two consecutive glints 440 at a certain distance in the image from the location in the image corresponding to the center of the Fresnel lens will be possible to determine given the known distance between two consecutive Fresnel rings of the Fresnel lens at a corresponding distance from the center of the Fresnel lens in the given setup.

Figure 5:
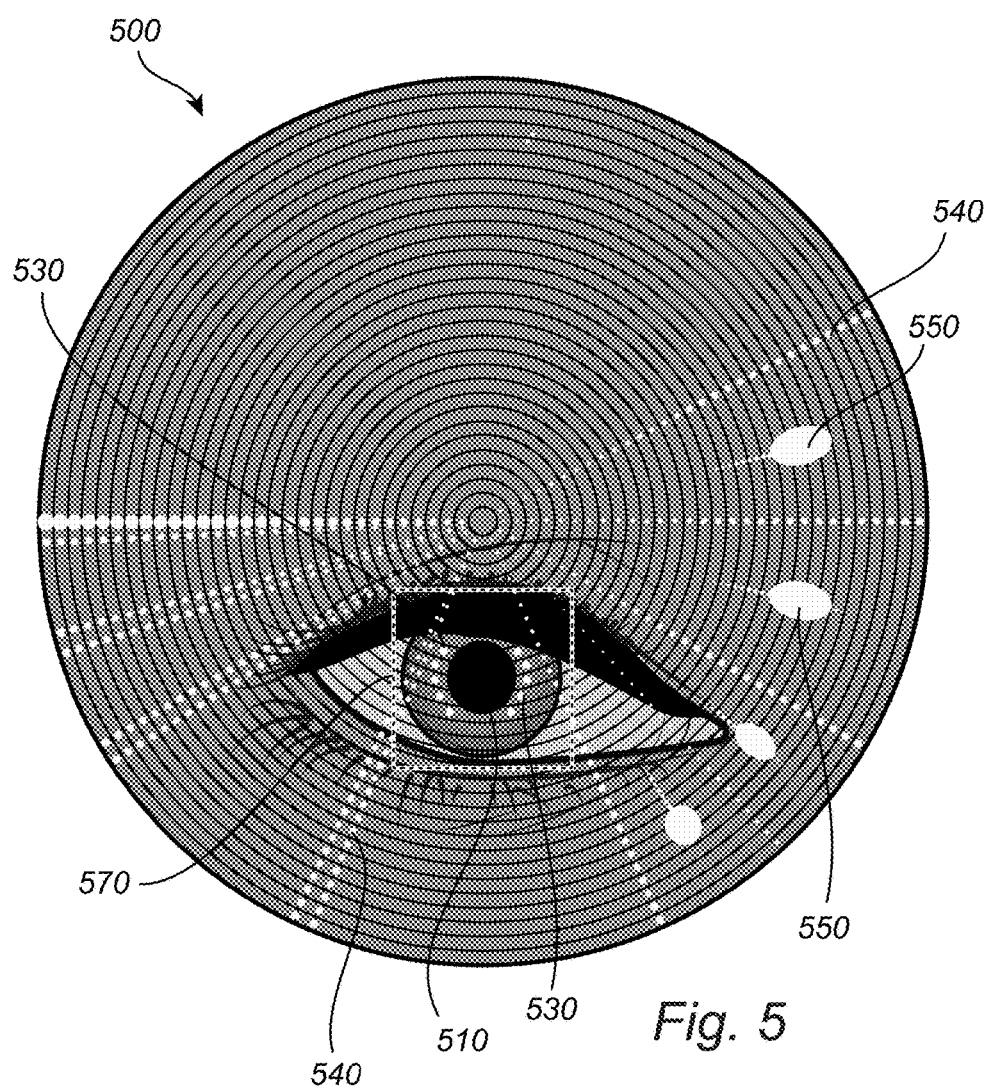
FIG. 5 shows an image of an eye.

FIG. 5 shows an image 500 of an eye of a user in relation to embodiments of which examples are disclosed in the following. The image is captured in a head mounted system such as the VR glasses disclosed in relation to FIGS. 3*a-c* including a VR lenses which is a Fresnel lenses.

The image 500 is the result of an image sensor detecting light from a plurality of illuminators reflected from the eye of the user and reflected from a lens of the spectacles together with Fresnel rings of a Fresnel lens of the VR glasses. The lens of the spectacles is located between the plurality of illuminators and the eye of the user and also between the Fresnel lens and the eye of the user. The image 500 of the eye of the user is then received in a processing circuitry from the image sensor.

As is illustrated in FIG. 5, glints 530 resulting from light from the plurality of illuminators reflected from the cornea of the user's eye appear in the image. Furthermore, glints 540 resulting from light from the plurality of illuminators being reflected from the lens of the spectacles together with the Fresnel rings of the Fresnel lens of the VR glasses also appear in the image. The Fresnel lens in relation to FIG. 5 has a known pattern which in the specific case is that the Fresnel rings are concentric and that the distance between two consecutive Fresnel rings is known for all two consecutive Fresnel rings. For example, the distance between two consecutive Fresnel rings can be uniform, i.e. the same between two consecutive Fresnel rings regardless which distance the two consecutive Fresnel rings are from the center of the Fresnel lens. In alternative, the distance can vary according to a function of the distance from the center of the Fresnel lens. The location of the glints 540 conform with the known pattern of the Fresnel lens of the VR glasses. For uniform distance, the glints 540 appear in straight lines with the same distance between all two consecutive glints where the straight lines are from a point in the image corresponding to a center of the Fresnel lens. The expected distance between two consecutive glints 540 in the image will be possible to determine given the known distance between two consecutive Fresnel rings of the Fresnel lens in the given setup. For varying distance, the glints 540 appear in straight lines with a distance between consecutive glints 540 varying according to the function where the straight lines are from the point in the image corresponding to the center of the Fresnel lens. The expected distance between two consecutive glints 540 at a certain distance in the image from the location in the image corresponding to the center of the Fresnel lens will be possible to determine given the known distance between two consecutive Fresnel rings of the Fresnel lens at a corresponding distance from the center of the Fresnel lens in the given setup.

In addition, blobs 550 appear in the image 500, where the blobs 550 are light from the plurality of illuminators being reflected from the lens of the spectacles. The blobs 550 are not due to the Fresnel lens and differ from the glints 540 resulting from light from the plurality of illuminators being reflected from the lens of the spectacles together with the Fresnel rings of the Fresnel lens of the VR glasses.

Glints 530 resulting from reflection from the cornea of the user's eye which are useful for eye tracking will appear in the image 500 within a specific distance from the position of the pupil 510 in the image. Any glints 530 resulting from a reflection from the cornea which is useful in eye tracking should not be mistaken for a glint 540 resulting from a reflection from the lens of the spectacles together with the Fresnel rings of the Fresnel lens of the VR glasses. Hence, a predetermined threshold value can be set in relation to the specific distance and only if the distance in the image from the pupil position to a glint 540 is larger than the predetermined threshold value, the glint 540 is identified as a representation of a reflection from a Fresnel ring of the Fresnel lens.

A region of interest, ROI, 570 can be defined. The ROI 570 is illustrated in FIG. 5 in as a square dashed lines but may have any other suitable shape, such as rectangle, circle, ellipse, etc. The ROI 570 is a portion of the image including the representation in the image of the pupil 510. The region of interest 570 is preferably defined as the minimal region including all glints 530 resulting from reflections from the cornea of the user's eye that are useful for eye tracking. Only glints appearing in the ROI are identified. Any glints outside the ROI 570 are not identified or at least not processed further. By limiting the glints blobs identified and further processed to any glints 530, 540 in the ROI 570 as defined above, the amount of processing required can be reduced. At the same time, not processing glints outside the ROI 570 may not, or only to a low degree, affect the possibility to identify the representation of the pupil 550 and/or the glints 530 in the image 500.

Figure 6:
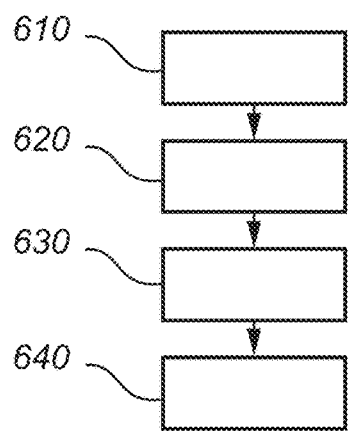
FIG. 6 is a flow chart of an example of a method of identifying reflections from optical arrangements in an eye tracking system.

FIG. 6 shows an example of a method of identifying reflections from optical arrangements in an eye tracking system. The method comprises receiving 610 an image of an eye of a user from an image sensor. The image is a result of the image sensor detecting light from one or more illuminators reflected from the eye of the user and reflected from optic arrangements located between the one or more illuminators and the eye of the user. The one or more illuminators may be arranged at substantially fixed positions in relation to an eye of a user when using the system. The optic arrangements comprise features characterized by (e.g., having) a known pattern. For example, the optic arrangements may comprise a Fresnel lens wherein the features having a known pattern are a plurality of concentric Fresnel rings of the Fresnel lens having known distances between consecutive Fresnel rings. The known distances between consecutive Fresnel rings of the plurality of concentric Fresnel rings of the Fresnel lens may either be the same between all two consecutive Fresnel rings or may vary as a function of a distance from a center of the Fresnel lens.

The one or more illuminators may be arranged at substantially fixed positions in relation to an eye of a user when using the system.

The method further comprises identifying 620 two or more glints in the image. A glint is a representation in the image of a reflection of light from a cornea of the eye of the user and/or from a feature of the optic arrangements. For example, when the optic arrangements comprise a Fresnel lens, the reflection of light may be in relation to a Fresnel rings of the Fresnel lens.

The method further comprises determining 630 relative positions in the image of the identified glints, and identifying 640, on condition that the relative positions in the image of the identified glints conform with the known pattern of the features of the optic arrangements, at least one glint of the identified glints as being a representation in the image of a reflection from a feature of the optic arrangements. For example, when the optic arrangements comprise a Fresnel lens wherein the features having a known pattern are a plurality of concentric Fresnel rings of the Fresnel lens having known distances between consecutive Fresnel rings, a distance in the image between a first glint and a second glint of the identified glints is determined. Furthermore, the relative positions in the image of the identified glints conform with the known pattern of the features of the optic arrangements on condition that the distance in the image between the first glint and the second glint of the identified glints conforms with the known distances between consecutive Fresnel rings of the plurality of concentric Fresnel rings of the Fresnel lens. The optic arrangements may further comprise a lens of a pair of spectacles worn by the user.

In a case where the known distances between consecutive Fresnel rings is uniform, i.e. the same for all two consecutive Fresnel rings, the distance in the image between the first glint and the second glint conforms with the known distances between consecutive Fresnel rings if the distance between the first glint and the second glint is what would be expected for representation of reflections from two consecutive Fresnel rings given the know distance between consecutive Fresnel rings.

In a case where the known distances between consecutive Fresnel rings is a function of a distance from a center of the Fresnel lens, the method further comprises determining positions of the identified glints in the image, and determining distances from the center of the Fresnel lens corresponding to the positions of the identified glints in the image. The distance in the image between the first glint and the second glint of the identified glints conforms with the known distances between consecutive Fresnel rings if the distance between the first glint and the second glint is what would be expected for representation of reflections from two consecutive Fresnel rings given the know distance between consecutive Fresnel rings at the determined distance from the center of the Fresnel lens.

The method may further comprise determining a pupil position of a representation in the image of a pupil of the eye and determining distances in the image from the pupil position to the identified glints. In such a case, only glints with a distance in the image from the pupil position to the at least one glint which is larger than a predetermined threshold value may be identified as a representation of a reflection from a Fresnel ring of the Fresnel lens.

The method when the optic arrangements comprise a Fresnel lens wherein the features having a known pattern are a plurality of concentric Fresnel rings of the Fresnel lens having known distances between consecutive Fresnel rings may comprise identifying at least three glints and determining further a distance in the image between the second glint and the third glint. For such a case, the relative positions in the image of the identified glints conform with the known pattern of the features of the optic arrangements on condition that the determined distance in the image between the first glint and the second glint and the determined distance between the second glint and the third glint conform with the known distances between consecutive Fresnel rings, and the first glint, the second glint and the third glint are position on a straight line in the image.

The method may further comprise defining a region of interest, ROI, including the representation of the pupil in the image, wherein only glints in the ROI are identified.

A person skilled in the art realizes that the present invention is by no means limited to the preferred embodiments described above. On the contrary, many modifications and variations are possible within the scope of the appended claims. For example, the person skilled in the art realizes that the methods described herein may be performed by other eye/gaze tracking systems than the example eye/gaze tracking system 100 shown in FIG. 1, for example any eye/gaze tracking system in which the location of illuminators is fixed in relation to the eyes of a user when the system is used and in eye/gaze tracking systems in which the location of illuminators is not fixed in relation to the eyes of the user when the system is used.

Furthermore, the descriptions have been made in relation to one eye. However, a person skilled in the art realizes that the methods and systems may be performed for two eyes also.

Additionally, variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The division of tasks between functional units referred to in the present disclosure does not necessarily correspond to the division into physical units; to the contrary, one physical component may have multiple functionalities, and one task may be carried out in a distributed fashion, by several physical components in cooperation. A computer program may be stored/distributed on a suitable non-transitory medium, such as an optical storage medium or a solid-state medium supplied together with or as part of other hardware, but may also be distributed in other forms, such as via the Internet or other wired or wireless telecommunication systems. The mere fact that certain measures/features are recited in mutually different dependent claims does not indicate that a combination of these measures/features cannot be used to advantage. Method steps need not necessarily be performed in the order in which they appear in the claims or in the embodiments described herein, unless it is explicitly described that a certain order is required. Any reference signs in the claims should not be construed as limiting the scope.

The invention claimed is:

1. A method of identifying reflections from optical arrangements in an eye tracking system, the method comprising:

receiving an image of an eye of a user from an image sensor, the image resulting from the image sensor detecting light from one or more illuminators reflected from the eye of the user and reflected from optic arrangements located between the one or more illuminators and the eye of the user, wherein the optic arrangements comprise features characterized by a known pattern, the optic arrangements comprising a Fresnel lens and the features comprising a plurality of concentric Fresnel rings of the Fresnel lens having known distances between consecutive Fresnel rings;

identifying two or more glints in the image, wherein a glint is a representation in the image of a reflection of light from a cornea of the eye of the user and/or from at least one feature of the features of the optic arrangements;

determining relative positions in the image of the identified glints, wherein the determining comprises determining a distance in the image between a first glint and a second glint of the identified glints, the relative positions in the image of the identified glints conforming with the known pattern of the features of the optic arrangements on a condition that the distance in the image between the first glint and the second glint of the identified glints conforms with the known distances between consecutive Fresnel rings of the plurality of concentric Fresnel rings of the Fresnel lens;

on a condition that the relative positions in the image of the identified glints conform with the known pattern of the features of the optic arrangements, identifying at least one glint of the identified glints as being a representation in the image of a reflection from at least one feature of the features of the optic arrangements;

determining a pupil position of a representation in the image of a pupil of the eye; and determining distances in the image from the pupil position to the identified glints, wherein the at least one glint is identified as a representation of a reflection from a Fresnel ring of the Fresnel lens on the further condition that the distance in the image from the pupil position to the at least one glint is larger than a predetermined threshold value.

2. The method of claim 1, wherein at least three glints are identified, and wherein determining relative positions in the image of the identified glints comprises:
determining a distance in the image between the first glint and the second glint; and
determining a distance in the image between the second glint and the third glint;
wherein the relative positions in the image of the identified glints conform with the known pattern of the features of the optic arrangements on condition that:
the determined distance in the image between the first glint and the second glint and the determined distance between the second glint and the third glint conform with the known distances between consecutive Fresnel rings of the plurality of concentric Fresnel rings of the Fresnel lens; and
the first glint, the second glint and the third glint are positioned on a straight line in the image.

3. The method of claim 1, wherein the known distances between consecutive Fresnel rings of the plurality of concentric Fresnel rings of the Fresnel lens are a function of a distance from a center of the Fresnel lens, further comprising:
determining positions of the identified glints in the image; and
determining distances from the center of the Fresnel lens corresponding to the positions of the identified glints in the image.

4. The method of claim 1, further comprising:
defining a region of interest, ROI, including the representation of the pupil in the image,
wherein only glints in the ROI are identified.

5. The method of claim 1, wherein the one or more illuminators are arranged at substantially fixed positions in relation to the eye of the user when using the system.

6. The method of claim 1, wherein the optic arrangements further comprise a lens of a pair of spectacles.

7. An eye tracking system comprising:
a receiver for receiving an image of an eye of a user from an image sensor, the image resulting from the image sensor detecting light from one or more illuminators reflected from the eye of the user and reflected from optic arrangements located between the one or more illuminators and the eye of the user, wherein the optic arrangements comprise features characterized by a known pattern, the optic arrangements comprising a Fresnel lens and the features comprising a plurality of concentric Fresnel rings of the Fresnel lens having known distances between consecutive Fresnel rings;
processing circuitry for:
identifying two or more glints in the image, wherein a glint is a representation in the image of a reflection of light from a cornea of the eye of the user or from at least one feature of the features of the optic arrangements;
determining relative positions in the image of the identified glints, wherein the determining comprises determining a distance in the image between a first glint and a second glint of the identified glints, the relative positions in the image of the identified glints conforming with the known pattern of the features of the optic arrangements on a condition that the distance in the image between the first glint and the second glint of the identified glints conforms with the known distances between consecutive Fresnel rings of the plurality of concentric Fresnel rings of the Fresnel lens;
on a condition that the relative positions in the image of the identified glints conform with the known pattern of the features of the optic arrangement, identifying at least one glint of the identified glints as being a representation of a reflection from at least one feature of the features of the optic arrangements;
determining a pupil position of a representation in the image of a pupil of the eye; and
determining distances in the image from the pupil position to the identified glints, wherein the at least one glint is identified as a representation of a reflection from a Fresnel ring of the Fresnel lens on the further condition that the distance in the image from the pupil position to the at least one glint is larger than a predetermined threshold value.

8. An eye tracking system comprising circuitry configured to:
receive an image of an eye of a user from an image sensor, the image resulting from the image sensor detecting light from one or more illuminators reflected from the eye of the user and reflected from optic arrangements located between the one or more illuminators and the eye of the user, wherein the optic arrangements comprise features characterized by a known pattern, the optic arrangements comprising a Fresnel lens and the features comprising a plurality of concentric Fresnel rings of the Fresnel lens having known distances between consecutive Fresnel rings;

identify two or more glints in the image, wherein a glint is a representation in the image of a reflection of light from a cornea of the eye of the user and/or from at least one feature of the features of the optic arrangements;

determine relative positions in the image of the identified glints, wherein the determining comprises determining a distance in the image between a first glint and a second glint of the identified glints, the relative positions in the image of the identified glints conforming with the known pattern of the features of the optic arrangements on a condition that the distance in the image between the first glint and the second glint of the identified glints conforms with the known distances between consecutive Fresnel rings of the plurality of concentric Fresnel rings of the Fresnel lens;

on a condition that the relative positions in the image of the identified glints conform with the known pattern of the features of the optic arrangements, identify at least one glint of the identified glints as being a representation in the image of a reflection from at least one feature of the features of the optic arrangements;

determining a pupil position of a representation in the image of a pupil of the eye; and determining distances in the image from the pupil position to the identified glints, wherein the at least one glint is identified as a representation of a reflection from a Fresnel ring of the Fresnel lens on the further condition that the distance in the image from the pupil position to the at least one glint is larger than a predetermined threshold value.

9. One or more computer-readable storage media storing computer-executable instructions that, when executed by an eye tracking system, cause the eye tracking system to:

receive an image of an eye of a user from an image sensor, the image resulting from the image sensor detecting light from one or more illuminators reflected from the eye of the user and reflected from optic arrangements located between the one or more illuminators and the eye of the user, wherein the optic arrangements comprise features characterized by a known pattern, the optic arrangements comprising a Fresnel lens and the features comprising a plurality of concentric Fresnel rings of the Fresnel lens having known distances between consecutive Fresnel rings;

identify two or more glints in the image, wherein a glint is a representation in the image of a reflection of light from a cornea of the eye of the user and/or from at least one feature of the features of the optic arrangements;

determine relative positions in the image of the identified glints, wherein the determining comprises causing the eye tracking system to determine a distance in the image between a first glint and a second glint of the identified glints, the relative positions in the image of the identified glints conforming with the known pattern of the features of the optic arrangements on a condition that the distance in the image between the first glint and the second glint of the identified glints conforms with the known distances between consecutive Fresnel rings of the plurality of concentric Fresnel rings of the Fresnel lens;

on a condition that the relative positions in the image of the identified glints conform with the known pattern of the features of the optic arrangements, identify at least one glint of the identified glints as being a representation in the image of a reflection from at least one feature of the features of the optic arrangements;

determine a pupil position of a representation in the image of a pupil of the eye; and determine distances in the image from the pupil position to the identified glints, wherein the at least one glint is identified as a representation of a reflection from a Fresnel ring of the Fresnel lens on the further condition that the distance in the image from the pupil position to the at least one glint is larger than a predetermined threshold value.

10. The one or more computer-readable storage media of claim 9, wherein at least three glints are identified, and wherein causing the eye tracking system to determine relative positions in the image of the identified glints comprises causing the eye tracking system to:

determining a distance in the image between the first glint and the second glint; and determining a distance in the image between the second glint and the third glint;

and wherein the relative positions in the image of the identified glints conform with the known pattern of the features of the optic arrangements on condition that:

the determined distance in the image between the first glint and the second glint and the determined distance between the second glint and the third glint conform with the known distances between consecutive Fresnel rings of the plurality of concentric Fresnel rings of the Fresnel lens; and the first glint, the second glint and the third glint are positioned on a straight line in the image.

11. The one or more computer-readable storage media of claim 9, wherein the known distances between consecutive Fresnel rings of the plurality of concentric Fresnel rings of the Fresnel lens are a function of a distance from a center of the Fresnel lens, and wherein the computer-executable instructions, when executed by the eye tracking system, further cause the eye tracking system to:

determine positions of the identified glints in the image; and determine distances from the center of the Fresnel lens corresponding to the positions of the identified glints in the image.

12. The one or more computer-readable storage media of claim 9, wherein the computer-executable instructions, when executed by the eye tracking system, further cause the eye tracking system to define a region of interest, ROI, including the representation of the pupil in the image, and wherein only glints in the ROI are identified.

* * * * *